US011381195B2

(12) United States Patent
Lee

(10) Patent No.: US 11,381,195 B2
(45) Date of Patent: Jul. 5, 2022

(54) APPARATUS FOR OPERATING PHASE CUT SWITCH IN MOTOR DRIVEN POWER STEERING APPARATUS

(71) Applicant: HYUNDAI MOBIS CO., LTD., Seoul (KR)

(72) Inventor: Jin Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 88 days.

(21) Appl. No.: 16/939,731

(22) Filed: Jul. 27, 2020

(65) Prior Publication Data

US 2021/0036650 A1 Feb. 4, 2021

(30) Foreign Application Priority Data

Jul. 30, 2019 (KR) .......................... 10-2019-0092238

(51) Int. Cl.
*H02P 29/032* (2016.01)
*B62D 5/04* (2006.01)
*H02P 27/06* (2006.01)

(52) U.S. Cl.
CPC ............ *H02P 29/032* (2016.02); *B62D 5/046* (2013.01); *H02P 27/06* (2013.01)

(58) Field of Classification Search
CPC ........ H02P 29/032; H02P 27/06; B62D 5/046
See application file for complete search history.

(56) References Cited

U.S. PATENT DOCUMENTS

| 10,259,491 | B2 * | 4/2019 | Shinkawa | B62D 5/0496 |
|---|---|---|---|---|
| 10,833,614 | B2 * | 11/2020 | Fujiwara | B62D 5/046 |
| 2010/0270958 | A1 * | 10/2010 | Tsuboi | B62D 5/0463 318/400.26 |
| 2011/0273122 | A1 * | 11/2011 | Murata | B62D 5/0487 318/400.22 |
| 2015/0364913 | A1 * | 12/2015 | Minoya | H02H 9/025 361/93.9 |
| 2016/0028336 | A1 * | 1/2016 | Oyama | H02P 29/032 318/564 |
| 2016/0181953 | A1 * | 6/2016 | Oyama | B62D 5/0487 180/446 |
| 2016/0344318 | A1 * | 11/2016 | Sun | H02K 1/2706 |
| 2017/0297616 | A1 * | 10/2017 | Kikuchi | B62D 5/0463 |

FOREIGN PATENT DOCUMENTS

| KR | 10-2011-0007766 A | 1/2011 | |
|---|---|---|---|
| WO | WO-2015019653 A1 * | 2/2015 | B62D 5/0481 |

* cited by examiner

*Primary Examiner* — Muhammad S Islam
*Assistant Examiner* — Devon A Joseph
(74) *Attorney, Agent, or Firm* — NSIP Law

(57) ABSTRACT

Provided is an apparatus for operating a phase cut switch in a motor driven power steering apparatus. The apparatus for operating a phase cut switch in a motor driven power steering apparatus includes: a phase cut switch installed for an inverter for converting a voltage into 3-phase power and driving a driving motor and for each phase of input terminals of the driving motor; a gate driving unit configured to receive a driving signal from a control device and operate the phase cut switch; and a current circulation unit configured to circulate a counter electromotive force of the driving motor at an output terminal of the gate driving unit and an output terminal of the phase cut switch.

5 Claims, 2 Drawing Sheets

APPARATUS FOR OPERATING PHASE CUT SWITCH IN MOTOR DRIVEN POWER STEERING APPARATUS

CROSS-REFERENCE TO RELATED APPLICATION

This application claims priority from and the benefit of Korean Patent Application No. 10-2019-0092238, filed on Jul. 30, 2019, which is hereby incorporated by reference for all purposes as if set forth herein.

BACKGROUND

Field

Exemplary embodiments of the present disclosure relate to an apparatus for operating a phase cut switch in a motor driven power steering apparatus, and more particularly, to an apparatus for operating a phase cut switch in a motor driven power steering apparatus for stably operating the phase cut switch for blocking a broken platform during a redundant operation of the motor driven power steering apparatus and substantially preventing the phase cut switch from being burn out by a current stored in a blocked driving motor.

Discussion of the Background

In general, a steering system is provided, in which a steering wheel is installed in front of a driver's seat of a vehicle, a steering shaft is connected to a rotating shaft of the steering wheel, and as a driver rotates the steering wheel, the rotating shaft of the steering wheel is rotated, the steering shaft is rotated, and the front wheels of the vehicle are rotated left and right to change the travel direction of the vehicle.

In such a steering system, when the driver steers the vehicle by directly transmitting a rotational force for rotating the steering wheel to the steering shaft, a lot of force is required for the driver to rotate the steering wheel.

Therefore, a hydraulic steering system using a hydraulic actuator when operating the steering wheel has been commercialized to reduce a force required when the driver steers the vehicle.

The existing steering system including the hydraulic steering system is a mechanical system in which the steering wheel and tires are mechanically connected, and the risk of injury to a driver increases due to protruding of the steering shaft connected to the steering wheel in the event of a vehicle collision, the output of an engine is reduced because the hydraulic actuator of the hydraulic steering system uses the power of the engine, a force capable of amplifying a steering force is limited, and the structure of the existing steering system is complicated due to a large number of hydraulic mechanisms and parts.

In this regard, recently, a motor driven power steering (MDPS) apparatus is used, in which an electric actuator is installed in a steering system of a vehicle and the electric actuator is operated as a driver rotates a steering wheel, so that the front wheels of the vehicle are rotated left and right to change the travel direction of the vehicle.

Such a motor driven power steering apparatus includes a torque sensor for measuring the steering torque of a driver inputted to a steering wheel, a steering angle sensor for measuring a steering angle of the steering wheel, a vehicle speed sensor for measuring a vehicle speed, and the like, determines driving conditions of a vehicle, and steers the vehicle while adjusting a current supplied to a driving actuator such as a motor.

The background art of the present disclosure is disclosed in Korean Patent Application Laid-Open No. 10-2011-0007766 (published on Jan. 25, 2011 and entitled "Apparatus and Method for Controlling Motor Relay in Electric Motor Driven Power Steering System").

SUMMARY

In order to drive or switch the motor of such a motor driven power steering apparatus, an inverter using a semiconductor element such as a metal-oxide-semiconductor field-effect transistor (MOSFET) and an insulated gate bipolar transistor (IGBT) is employed.

Recently, in order to enhance stability, the motor driven power steering apparatus is also implemented with redundancy, and when one of two platforms is broken, it is important to completely block the broken platform. In such a case, when the broken platform is not completely blocked, a counter electromotive force of the broken platform occurs and thus a redundant platform may not normally operate.

In order to block the broken platform, a phase cut switch of the MOSFET is generally used. However, when the phase cut switch is operated to block motor coil energy in an emergency situation, the phase cut switch may be burn out by stored energy. Thus, it is necessary to protect the phase cut switch by circulating the stored energy.

Various embodiments are directed to an apparatus for operating a phase cut switch in a motor driven power steering apparatus for stably operating the phase cut switch for blocking a broken platform during a redundant operation of the motor driven power steering apparatus and substantially preventing the phase cut switch from being burn out by a current stored in a blocked driving motor.

In an embodiment, an apparatus for operating a phase cut switch in a motor driven power steering apparatus includes: a phase cut switch installed for an inverter for converting a voltage into 3-phase power and driving a driving motor and for each phase of input terminals of the driving motor; a gate driving unit configured to receive a driving signal from a control device and operate the phase cut switch; and a current circulation unit configured to circulate a counter electromotive force of the driving motor at an output terminal of the gate driving unit and an output terminal of the phase cut switch.

In an embodiment, the phase cut switch is a switch having a MOSFET structure in which an input terminal is connected to the inverter, an output terminal is connected to the driving motor, and a driving terminal is connected to the gate driving unit.

In an embodiment, the current circulation unit includes: a first resistor installed between the driving terminal of the phase cut switch and the input terminal of the driving motor; a second resistor installed between the driving terminal of the phase cut switch and the output terminal of the gate driving unit; and a freewheeling diode installed between the driving terminal of the phase cut switch and a ground.

In an embodiment, the gate driving unit includes: a level shift section configured to increase a level of the driving signal inputted from the control device; an output section configured to receive the driving signal from the level shift section and supply a driving voltage to the phase cut switch; and a charge pumping section configured to receive and charge-pump a battery voltage and supply an operating voltage to the output section.

In an embodiment, the output section receives the operating voltage of the charge pumping section in correspondence to a voltage of the output terminal of the phase cut switch, and supplies the driving voltage to the phase cut switch.

According to the apparatus for operating a phase cut switch in a motor driven power steering apparatus in accordance with an aspect of the present disclosure, it is possible to stably operate the phase cut switch for blocking a broken platform during a redundant operation of the motor driven power steering apparatus and substantially prevent the phase cut switch from being burn out by a current stored in a blocked driving motor.

DETAILED DESCRIPTION OF THE ILLUSTRATED EMBODIMENTS

Figure 1:
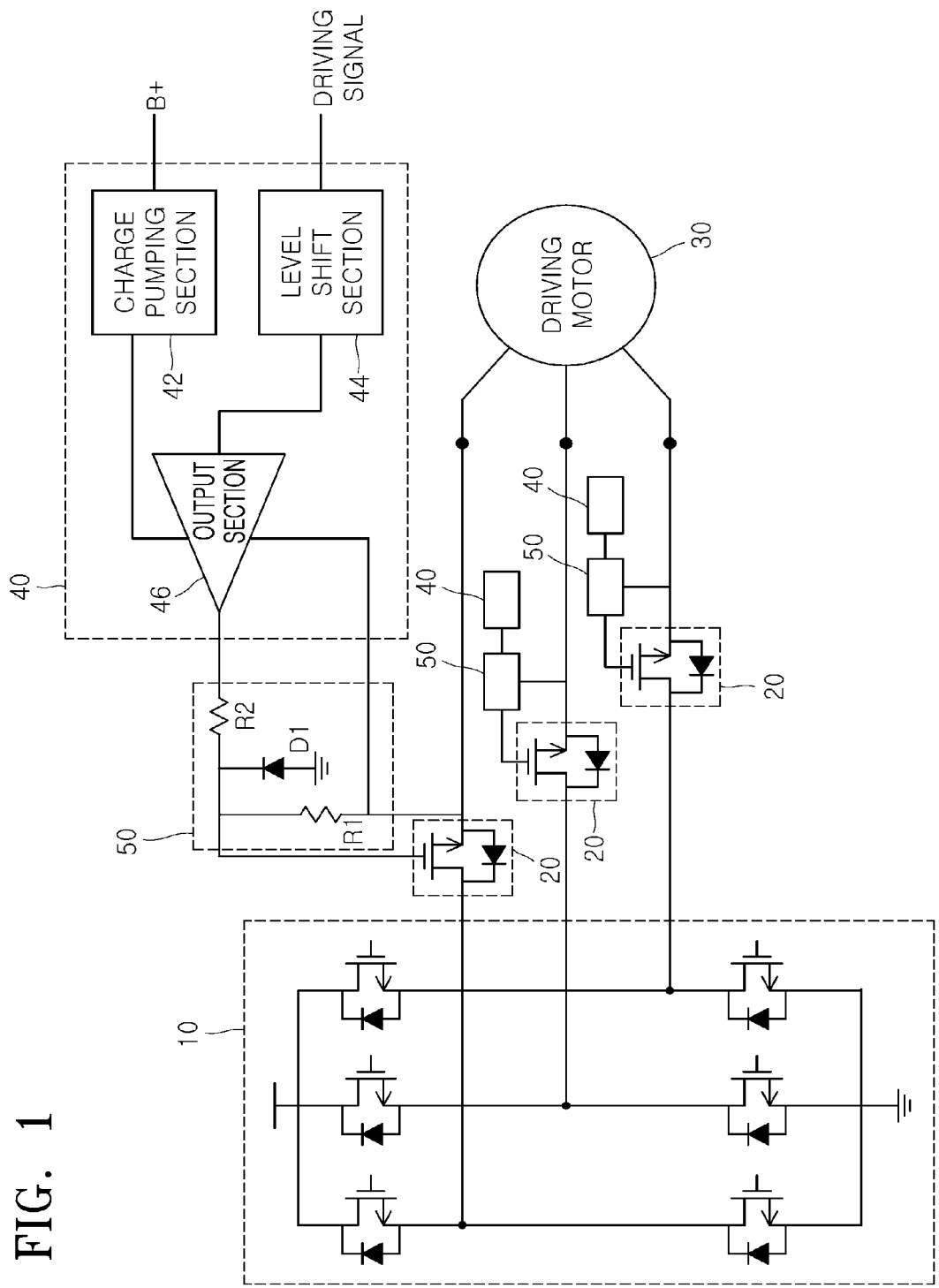
FIG. 1 is a circuit configuration diagram illustrating an apparatus for operating a phase cut switch in a motor driven power steering apparatus in accordance with an embodiment of the present disclosure.

Hereinafter, an apparatus for operating a phase cut switch in a motor driven power steering apparatus will be described below with reference to the accompanying drawings through various exemplary embodiments.

In this process, the thicknesses of lines or the sizes of elements illustrated in the drawings may be exaggerated for the purpose of clarity and convenience of explanation. Terms to be described later are terms defined in consideration of functions thereof in the present disclosure and may be changed according to the intention of a user or an operator, or practice. Accordingly, such terms should be defined based on the disclosure over the present specification.

Figure 2:
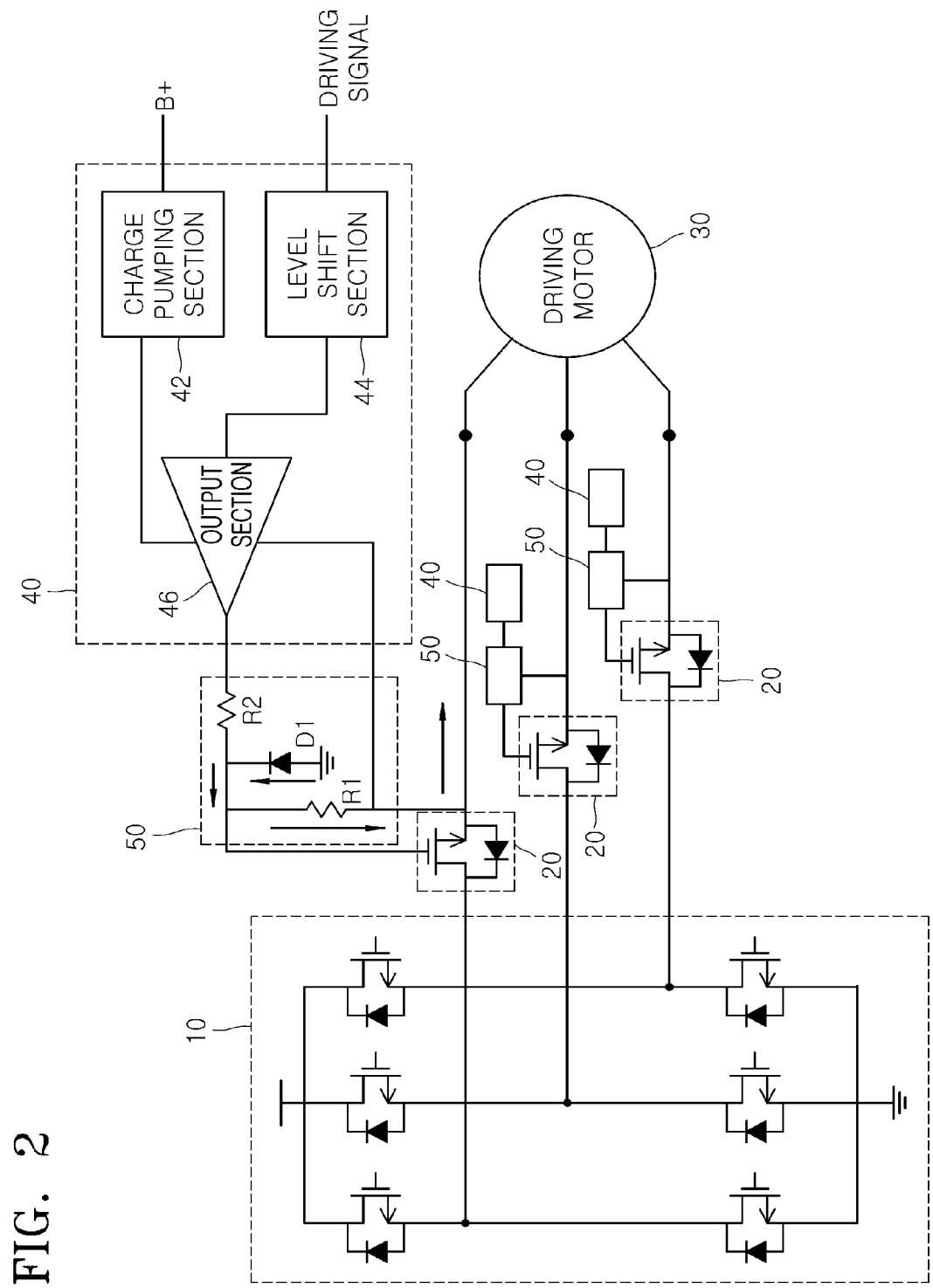
FIG. 2 is a diagram illustrating a current circulation state in the apparatus for operating a phase cut switch in a motor driven power steering apparatus in accordance with an embodiment of the present disclosure.

FIG. 1 is a circuit configuration diagram illustrating an apparatus for operating a phase cut switch in a motor driven power steering apparatus in accordance with an embodiment of the present disclosure, and FIG. 2 is a diagram illustrating a current circulation state in the apparatus for operating a phase cut switch in a motor driven power steering apparatus in accordance with an embodiment of the present disclosure.

As illustrated in FIG. 1 and FIG. 2, the apparatus for operating a phase cut switch in a motor driven power steering apparatus in accordance with an embodiment of the present disclosure may include a phase cut switch 20, a gate driving unit 40, and a current circulation unit 50.

The phase cut switch 20 may be installed for an inverter 10 for converting a motor driving voltage into 3-phase power and driving a driving motor 30 and for each phase of input terminals of the driving motor 30, thereby substantially preventing an instable current of the inverter 10 from being supplied to the driving motor 30.

Preferably, the phase cut switch 20 is a switch having a MOSFET structure in which an input terminal is connected to the inverter 10, an output terminal is connected to the driving motor 30, and a driving terminal is connected to the gate driving unit 40.

The gate driving unit 40 may receive a driving signal from a control device (not illustrate) and operate the phase cut switch 20.

The gate driving unit 40 may include a level shift section 44, an output section 46, and a charge pumping section 42.

The level shift section 44 increases the level of a low-level driving signal inputted from the control device and outputs the driving signal having an increased level to the output section 46.

The output section 46 receives the driving signal with the increased level from the level shift section 44, and supplies a driving voltage to the phase cut switch 20, thereby operating the phase cut switch 20.

Here, the output section 46 may receive an operating voltage of the charge pumping section 42 in correspondence to an output terminal voltage of the phase cut switch 20, and supply the driving voltage to the phase cut switch 20.

The charge pumping section 42 may receive and charge-pump a battery voltage B+ and supply an operating voltage to the output section 46 such that the output section 46 may stably supply the driving voltage, thereby allowing the phase cut switch 20 to be stably operated.

Each of the level shift section 44, the output section 46, and the charge pumping section 42 may be implemented using a publicly-known circuit configuration such as a level shift circuit and a charge pumping circuit, or may be implemented by including an operational amplifier (OP-AMP) and the like.

The current circulation unit 50 may circulate the counter electromotive force of the driving motor 30 at the output terminal of the gate driving unit 40 and the output terminal of the phase cut switch 20, thereby substantially preventing the phase cut switch 20 from being burn out by energy stored in the driving motor 30.

The current circulation unit 50 may include a first resistor R1 installed between a driving terminal of the phase cut switch 20 and the input terminal of the driving motor 30, a second resistor R2 installed between the driving terminal of the phase cut switch 20 and the output terminal of the gate driving unit 40, and a freewheeling diode D1 installed between the driving terminal of the phase cut switch 20 and the ground.

Accordingly, as illustrated in FIG. 2, the first resistor R1 may perform a function of substantially maintaining a voltage between the driving terminal and the output terminal of the phase cut switch 20 when the phase cut switch 20 is in a turn-on state, and may allow a voltage applied to the driving terminal to pass to the output terminal when the phase cut switch 20 is in a turn-off state.

Furthermore, when a problem occurs in the inverter 10 and the phase cut switch 20 is turned off, as the voltage of the output terminal is lowered to a (−) voltage, and a current path is formed through the freewheeling diode D1 and the first resistor R1 from the ground, so that the driving terminal and the output terminal of the phase cut switch 20 are turned on and a current is circulated.

The second resistor R2 may serve to delay the phase cut switch 20 when the phase cut switch 20 is turned on/off, thereby reducing noise.

When the apparatus for operating a phase cut switch in a motor driven power steering apparatus is in a normal state, the phase cut switch 20 is turned on by a driving signal outputted from the control device, so that the driving motor 30 may be driven through a motor driving voltage outputted from the inverter 10.

On the other hand, when the inverter 10 is broken and incomplete current control is performed, the control device outputs a driving signal for turning off the phase cut switch 20 through a driving signal.

In such a case, when the current flows from the driving motor 30 to the inverter 10 before the phase cut switch 20 is turned off, coil energy stored in the driving motor 30 flows through a body diode of the phase cut switch 20 and thus energy remaining in the coil of the driving motor 30 is exhausted.

Meanwhile, when the current flows from the inverter 10 to the driving motor 30 before the phase cut switch 20 is turned off, the phase cut switch 20 is turned off, the voltage of the output terminal of the phase cut switch 20 is reduced, and a current path is formed through the freewheeling diode D1 and the first resistor R1 of the current circulation unit 50. Thus, as the driving terminal and the output terminal of the phase cut switch 20 are turned on, energy remaining in the coil of the driving motor 30 is exhausted, thereby substantially preventing burnout of the phase cut switch 20.

As described above, according to the apparatus for operating a phase cut switch in a motor driven power steering apparatus in accordance with an embodiment of the present disclosure, it is possible to stably operate the phase cut switch for blocking a broken platform during a redundant operation of the motor driven power steering apparatus and substantially prevent the phase cut switch from being burn out by a current stored in a blocked driving motor.

Although the present disclosure has been described with reference to the embodiments illustrated in the drawings, the embodiments of the disclosure are for illustrative purposes only, and those skilled in the art will appreciate that various modifications and other equivalent embodiments are possible.

Thus, the true technical scope of the disclosure should be defined by the following claims.

What is claimed is:

1. An apparatus for operating a phase cut switch in a motor driven power steering apparatus, the apparatus comprising:
    a phase cut switch installed for an inverter for converting a voltage into 3-phase power and driving a driving motor and for each phase of input terminals of the driving motor;
    a gate driving unit configured to receive a driving signal from a control device and operate the phase cut switch; and
    a current circulation unit configured to circulate a counter electromotive force of the driving motor at an output terminal of the gate driving unit and an output terminal of the phase cut switch and installed between the phase cut switch and the gate driving unit.

2. The apparatus according to claim 1, wherein the phase cut switch is a switch having a MOSFET structure in which an input terminal is connected to the inverter, an output terminal is connected to the driving motor, and a driving terminal is connected to the gate driving unit.

3. The apparatus according to claim 2, wherein the current circulation unit comprises:
    a first resistor installed between the driving terminal of the phase cut switch and an input terminal of the driving motor;
    a second resistor installed between the driving terminal of the phase cut switch and the output terminal of the gate driving unit; and
    a freewheeling diode installed between the driving terminal of the phase cut switch and a ground.

4. The apparatus according to claim 1, wherein the gate driving unit comprises:
    a level shift section configured to increase a level of the driving signal input from the control device;
    an output section configured to receive the driving signal from the level shift section and supply a driving voltage to the phase cut switch; and
    a charge pumping section configured to receive and charge-pump a battery voltage and supply an operating voltage to the output section.

5. The apparatus according to claim 4, wherein the output section receives the operating voltage of the charge pumping section in correspondence to a voltage of the output terminal of the phase cut switch, and supplies the driving voltage to the phase cut switch.

* * * * *